(12) United States Patent
Boehlau et al.

(10) Patent No.: US 12,130,388 B2
(45) Date of Patent: Oct. 29, 2024

(54) METHOD FOR OPERATING A LIDAR SYSTEM

(71) Applicant: Hella GmbH & Co. KGaA, Lippstadt (DE)

(72) Inventors: Christian Boehlau, Rietberg (DE); Hans-Arne Driescher, Berlin (DE); Hans-Lothar Volk, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 1046 days.

(21) Appl. No.: 17/071,758

(22) Filed: Oct. 15, 2020

(65) Prior Publication Data
US 2021/0109203 A1  Apr. 15, 2021

(30) Foreign Application Priority Data

Oct. 15, 2019  (DE) .................... 10 2019 127 725.6
Feb. 19, 2020  (DE) .................... 10 2020 104 338.4

(51) Int. Cl.
*G01S 7/497* (2006.01)
*G01S 17/89* (2020.01)
*G01S 17/931* (2020.01)

(52) U.S. Cl.
CPC .............. *G01S 7/497* (2013.01); *G01S 17/89* (2013.01); *G01S 17/931* (2020.01)

(58) Field of Classification Search
CPC ........ G01S 7/497; G01S 17/931; G01S 17/89; G01S 7/484; G01S 17/10
USPC ......................................................... 356/4.01
See application file for complete search history.

(56) References Cited

U.S. PATENT DOCUMENTS

| | | | |
|---|---|---|---|
| 7,534,994 B2 * | 5/2009 | Check ....................... | G01J 1/32 250/238 |
| 10,222,459 B2 * | 3/2019 | Sparbert ............... | G01S 7/4817 |
| 10,562,379 B2 * | 2/2020 | Ghannam .................. | B60J 3/04 |
| 2018/0120424 A1 | 5/2018 | Eshel et al. | |

FOREIGN PATENT DOCUMENTS

DE        102020104338 A1 *  4/2021  ............. G01S 17/89

\* cited by examiner

*Primary Examiner* — Daniel L Murphy
(74) *Attorney, Agent, or Firm* — Muncy, Geissler, Olds & Lowe, P.C.

(57) ABSTRACT

A method and system for operating a LiDAR system for an environment detection in a field of view (FOV) of the system, wherein the following steps are performed: detection of at least one temperature measurement, which differs from a loading temperature in at least one light source of the system, estimation of the loading temperature based on the temperature measurement using an evaluation function, specification of an operating limit, which is specific for the maximum thermal load capacity of the light source, provision of a preset for at least one region of interest (ROI) in the field of view (FOV), adjustment of an operation of the system, and based on the preset for the region of interest (ROI) and the estimated loading temperature and the operating limit.

14 Claims, 2 Drawing Sheets

METHOD FOR OPERATING A LIDAR SYSTEM

This nonprovisional application claims priority under 35 U.S.C. § 119(a) to German Patent Application No. 10 2019 127 725.6, which was filed in Germany on Oct. 15, 2019, and German Patent Application No. 10 2020 104 338.4, which was filed in Germany on Feb. 19, 2020, and which is herein incorporated by reference.

BACKGROUND OF THE INVENTION

Field of the Invention

The present invention relates to a method for operating a LiDAR system for detecting the environment in a field of view of the system. The invention further relates to a system and a computer program.

Description of the Background Art

It is known from the prior art that LiDAR systems are used in vehicles for detecting the environment in order to be able to detect the vehicle environment at a high range and with high site-specific differentiation. Specifically, lasers can be used for this purpose, the emitted laser beams of which are deflected by mirrors or other deflectors so as to detect various horizontal and/or vertical positions. In this way, a two- or three-dimensional field of view of the environment is created, in which the system is able to detect objects.

The laser output can usually be either constant or already specified based on an image frequency and angle. The laser is then operated with a largely constant output, whereby the output can be independent of the vehicle environment. In order to avoid malfunctions, a very large thermal reserve is used to achieve the maximum possible output, or complex cooling of the system is used. This has the disadvantage of limited performance or higher technical complexity.

A generic method is known from US 2018 0120424.

SUMMARY OF THE INVENTION

It is therefore an object of the present invention to at least partially remedy the disadvantages described above. In particular, it is the object of the present invention to enable improved operation of a LiDAR system.

Features and details that are described in connection with the method according to the invention naturally also apply in connection with the system according to the invention and the computer program according to the invention, and vice versa, so that with regard to the disclosure of the individual aspects of the invention, mutual reference is or can always be made.

The object is achieved in particular by a method for operating a system, in particular a sensor system and/or LiDAR system, preferably for a vehicle, particularly preferably for detecting the environment in a field of view of the system.

In particular, it is provided that the following steps are carried out, preferably one after the other in the specified order or in any order, wherein some or all of the steps can also be carried out repeatedly:

detecting at least one temperature measurement (e.g., in the system and in particular of at least one light source of the system), which differs from a loading temperature of the system, preferably in at least one light source of the system, but in particular is specific for the loading temperature (e.g., as a temperature in the vicinity or environment of the light source), wherein the detection takes place, for example, by means of a temperature sensor adjacent to the light source, estimating the loading temperature on the basis of the temperature measurement using an evaluation function, such as a model or the like (in the simple case of multiplication with a predefined factor and/or the application of an empirically predetermined transfer function, for example)

setting an operating limit, in particular a permissible thermal budget, which is specific for the maximum thermal load capacity of the light source and/or the system, e.g., as a predefined operating limit or (e.g., proportionally) as a function of the estimated operating temperature, provision of a preset for at least one region of interest in the field of view, e.g., as a predefined preset or by means of a sensor analysis, adjustment of the operation of the system based on the preset for the region of interest and/or the estimated loading temperature and/or the operating limit, e.g., by increasing the power of the light source in the region of interest and limiting the power for the entire field of view in proportion to the loading temperature and/or operating limit.

Thus, by means of the estimation, it can be advantageously avoided in advance that the maximum thermal load capacity, in particular the critical temperature, is exceeded. When specifying the operating limit, timely and proper planning of the thermal budget based on the estimated loading temperature can take place, and the planned thermal budget can be considered when adjusting the operation. Thus, it is possible for the adjustment of the power of the light source, in particular the laser power, to take place within the thermal budget so as to optimize the range in selected areas of the field of view (that is, the regions of interest). Since the range for the detection of the environment can depend on the power of the light source, the range can also be optimized by making optimal use of the thermal budget. It can be provided that the operating limit is always fully maximized or nearly maximized when adjusting the operation by a maximum of power being used for the operation until the operating limit is reached.

The steps provided in the method according to the invention can also be carried out repeatedly, so that these steps are run through several times. With each of the runs, the operating limit can be reset so that the maximum available power can always be called up.

It may optionally be possible for the evaluation function to include a model in order to carry out model-assisted estimation, wherein the loading temperature is preferably specific for the light-generating element of the light source (and in particular for a junction temperature and/or at least one other maximum component temperature of the light source), and/or the operating limit for a maximum (optical-electrical) loading temperature of the light source is specifically set. Accordingly, the maximum loading temperature or the maximum component temperature can also be understood as the maximum opto-component temperature for the light source. The maximum (opto) component temperature and/or a maximum permitted loading temperature specifies the maximum thermal load capacity of the light source. The maximum loading temperature and/or the maximum (opto) component temperature must not be exceeded in order to ensure correct functioning of the light source. Due to the deviation between the temperature measurement and the loading temperature or (opto) component temperature, there is a risk that the maximum loading temperature or component temperature can only be exceeded if the temperature measurement is taken into account. The estimation is therefore carried out in order to at least approximately determine the loading temperature and to thus reduce the risk of exceeding it or to completely exclude the possibility of exceeding it. On the basis of the estimated loading temperature, the operating limit is then set, that is, e.g., the thermal budget for the operation of the system is set and/or planned. The operating limit, for example based on a predefined operating limit, can be increased with an increase in the loading temperature decreased with a decrease in the loading temperature. Depending on the type of light source, parameters other than the junction temperature can also be critical. The junction temperature may relate to semiconductor diodes, e.g., for fiber lasers, the fiber temperature could also be understood to be the loading temperature.

It is conceivable that when the temperature measurement is detected, other parameters specific to the exposure temperature are also detected, such as e.g., currents and/or voltages in the system or the light source, temperatures of at least one other component of the system, in particular adjacent to the light source, an optical power of the light source, a vehicle speed, an outside temperature of the vehicle, an operating state of the air conditioning system or the like. The accuracy of the estimate or the model can thus be improved.

Optionally, it is conceivable that the adjustment of the system operation could include the following steps:

determining a power distribution in the field of view based on the preset for the region of interest and the estimated loading temperature, so that during further operation of the system the loading temperature preferably remains below the operating limit, in particular below a temperature critical for operation and/or within a thermal budget (e.g., taking into account the compliance with component limit values, service life requirements and the like), adjusting the power of the light source based on the previously determined power distribution.

In this way, by determining the power distribution, the heat prospectively generated by the system and in particular by the light source can be proactively kept within this budget or below the operating limit. Estimating the loading temperature and/or specifying the operating limit and/or determining the power distribution can take place in advance of the actual operation of the light source (i.e., activation of the light source, setting of the power) and thus within a planning phase. A particular advantage can thus also result from the fact that exceeding the maximum thermal load capacity, such as a maximum loading temperature, can be avoided by including the operating limit or the thermal budget in the planning phase in advance. The determination of the thermal budget can e.g., also be done based on the service life specification for the light source. Thereby, the service life of the component (i.e., the light source) can also be dependent on the temperature. The thermal budget can e.g., relate to an area in which the temperature of the light source may be in use.

The at least one light source can in each case have a single light-emitting element or a plurality of light-emitting elements. These can e.g., be sources coupled in the light beam or even entire arrays from other light sources (e.g., VCSEL or laser diode arrays from edge emitters). The light source can also be designed as a light-emitting diode (LED) or as a laser or laser diode or as another semiconductor light source.

The light source can also be generally understood as a "radiation source", since the "light" emitted as a result can include all possible spectral ranges. In the context of this invention, the term "light" is therefore not restricted to visible light and can also include, for example, infrared light or other spectral ranges.

The power distribution in the field of view can be determined on the basis of the preset for the at least one region of interest by dividing the power for planned activations of the light source. The division may in this case take place on the basis of regions of interest so that more interesting regions get assigned more power than less interesting regions. For this purpose, the preset can e.g., specify a percentage of the available power or energy. The planned activations can be predefined in time and/or take place for different areas of the field of view. For this purpose, a different deflection of the light, in particular the laser beam of the light source can be used for each of the planned activations. The deflection takes place, for example, by means of a deflection unit such as a mirror (such as a MEMS mirror, micro scanner or the like) or optical phased arrays or waveguides.

Determining the power distribution in the field of view may also be done based on the estimated loading temperature, in that the operating limit, in particular a thermal budget, has been previously specified based on the estimated loading temperature, and the operating limit or budget set in this manner is then taken into account in determining the power distribution. In particular, this operating limit or budget is used to determine a maximum energy or heat that may be consumed or generated for the planned activation of the light source. This also simultaneously sets an upper limit as to the extent to which the power can be distributed. Based on the preset, this maximum power or the maximum energy converted by it or the maximum heat can then e.g., be distributed to the planned activations as a percentage or according to a different distribution ratio. The light source can then be controlled in accordance with this distribution, that is to say the power can be set. This has the effect that the loading temperature remains below the maximum thermal load capacity during further operation of the system, specifically within the scope of a specified thermal budget. The specification can e.g., be done by specifying the operating limit based on the estimated loading temperature, e.g., as the maximum temperature which is in proportion to the estimated loading temperature. Further influencing factors can also be taken into account (e.g., the operating time). Alternatively, the specification of the operating limit can also be done as a preset of a predefined (for example, empirically determined) operating limit.

Another advantage within the scope of the invention can be achieved if the adjustment of the operation of the system comprises the following step: adjusting the power of the light source, which is in the form of a laser and/or a semiconductor light source, in particular a laser or a light-emitting diode.

The system can detect the environment at a very long range. The field of view can e.g., be designed to be two- or three-dimensional in that the laser light emitted by the laser is deflected horizontally and/or vertically by mechanically moving components. The components that can be used in this case can be, e.g., a deflection unit such as a mirror scanner or the like. In the LiDAR (abbreviation for light detection and ranging) system, the detection of the environment can e.g., be done in that distances to a target are measured based on the transmission duration of the emitted light and—only by way of example—one or more laser pulses emitted by the light source. The LiDAR system can also be designed as a Flash LiDAR, dispensing with mechanically moving components. CW lasers can also be used as light sources, which emit modulated laser light.

Specifically, it can be provided that the system according to the invention is integrated in a vehicle, preferably in a motor vehicle and/or passenger vehicle and/or electric vehicle and/or hybrid vehicle. The vehicle can e.g., be designed as an autonomous vehicle. The detection of the environment can relate to detection in the vehicle surroundings, preferably at least in the front environment, that is to say in the direction of travel.

In the case of autonomous vehicles in particular, the greatest possible detection range of the sensor system is required at higher speeds. With the LiDAR system according to the invention, the achievable range can be limited by the power of the light source, in particular laser (source) or LED. The use of the maximum power available from the light source can often fail due to the permissible loading temperature of the system, since specified sizes, installation locations and mechanical and electronic components already included in the system as well as similar boundary conditions limit the heat dissipation possible from the LiDAR system. This often means that conventionally, the maximum range of the system cannot be achieved. One idea of the invention can be that the requirements (e.g., the specific environment) allow for an uneven distribution of the sensor range across the field of view (FOV). For example, a very high range may be required in the central area, but only a significantly smaller range in the edge area of the field of view. This degree of freedom can then be used when controlling the light source in order to optimize the range and to avoid exceeding the permissible temperature.

Furthermore, it can be provided within the scope of the invention that the adjustment of the operation of the system comprises the following step: setting the power of the light source for specifying a subsequent detection pattern with which preferably the power of the light source is preset in different positions and/or areas of the field of view.

Thus, the detection pattern determines the power for respective activations of the light source for the different positions or areas. The different positions or areas can specifically correspond to directions in which the light beam emitted by the light source is directed. This can e.g., be done by deflection using a deflection unit such as a mirror. To implement the detection pattern, the light source can then be activated in accordance with the power distribution and synchronized with this deflection.

Furthermore, it can be provided that the preset takes place on the basis of a static preset which preferably specifies a minimum output of the light source for specified positions and/or areas of the field of view.

A minimum output can e.g., be specified for positions of the field of view in which the floor level of the vehicle is expected to be. This has the advantage that certain surrounding areas and/or objects can always be detected as regions of interest.

According to an advantageous development of the invention, it can be provided that setting is done as a function of a dynamic preset, which preferably defines a specified power output for positions and/or areas of the field of view as a function of the previous environment detection and/or detection by additional sensors. The dynamic preset can e.g., influence the regions of interest using environment information (also detected by other sensors). For example, when objects such as vehicles driving ahead or pedestrians are detected, the position of these objects is dynamically defined as a region of interest.

According to a further possibility it can be provided that the adjustment of the operation of the system comprises the following step: setting the power of the light source based on a required range in the detection of the environment, which is preferably dependent on the preset for the region of interest.

It may be possible that, depending on the position, it is known that less energy is required (e.g., beams directed straight downward require less energy, since less of a range is required). Reducing the power of the light source for these positions has the advantage that the thermal reserve is increased so as to stay within the thermal budget.

In a further possibility it can be provided that the adjustment of the operation of the system comprises the following step: determining the power distribution of the light source in the field of view on the basis of the preset for the region of interest, so that the power is preferably increased for the at least one region of interest and reduced outside the at least one region of interest.

In addition, it may be possible for different regions of interest to be provided with different priorities in order to further modify the power based on the priority.

Advantageously, it can be provided within the scope of the invention that specifying the operating limit is done based on the estimated loading temperature for planning a thermal budget, with which the system is operated in accordance with the adjustment of the operation. In other words, the thermal budget can be determined in the step "specification of the operating limit", in particular on the basis of the estimated loading temperature. The thermal budget can be understood as an indication of the extent to which there is still a thermal reserve for the heat development of the light source or the system, until the maximum thermal load capacity is reached. In other words, the thermal budget defines the range in which the power of the light source can be adjusted without a malfunction occurring. The thermal budget can also be redefined, so to speak repeatedly updated, each time the steps of the method according to the invention are run through. This ensures that the loading temperature always remains below the maximum loading temperature, but that the largest possible thermal reserve can be used.

Furthermore, it can be provided within the scope of the invention that the adjustment of the operation and/or the setting of the operating limit is carried out on the basis of the estimated loading temperature so as to determine a thermal budget for the operation of the system.

This ensures that the maximum loading temperature is not exceeded when the light source is activated during operation. The loading temperature can be specifically estimated so that the power distribution can be proactively determined in order not to exceed the maximum loading temperature during subsequent operation and during the associated implementation of this power distribution when activating the light source, therefore remaining within the thermal budget.

The invention also relates to a system, in particular a LiDAR system, for detecting the environment in a field of view of the system, comprising:

a detection component for detecting at least one temperature measurement, which deviates from a loading temperature in at least one light source of the system, an estimation component for estimating the loading temperature based on the temperature measurement using an evaluation function, a specification component for specifying an operating limit which is specific for the maximum thermal load capacity of the light source, a provision component for providing a preset for at least one region of interest in the field of vision, an adjustment component for adjusting an operation of the system based on the preset for the interest region and/or the estimated loading temperature and/or the operating limit.

The system according to the invention thus has the same advantages as have been described in detail with reference to the method according to the invention. In addition, the system can be suitable for being operated according to the method according to the invention. The components described can each be part of a control and/or evaluation device or a computer program. It is also possible that some of the components, such as the detection component, are designed as separately formed devices.

It is also advantageous if the detection component, in particular in the form of a temperature sensor, is placed in the inventive system in an environment outside of the light source. This enables a technically simple temperature measurement. However, this means that the temperature measurement also deviates at least slightly from the loading temperature.

The invention also relates to a computer program, preferably a computer program product, which comprises commands which during the execution of the computer program by a control and/or evaluation device cause the latter to execute the following steps:

the detection of at least one temperature measurement, which differs from a loading temperature in at least one light source of the system, e.g., by exchanging signals with a temperature sensor, the estimation of the loading temperature based on the temperature measurement using an evaluation function, the specification of an operating limit, which is specific to the maximum thermal load capacity of the light source, the provision of a preset for at least one region of interest in the field of view, the adjustment of the operation of the system based on the preset for the region of interest and/or the estimated loading temperature and/or the operating limit.

The computer program according to the invention thus has the same advantages as have been described in detail with reference to a method according to the invention. In addition, the commands can be designed to cause the control and/or evaluation device to execute the steps of a method according to the invention when the computer program is run. For this purpose, the control and/or evaluation device can comprise a processor for executing the commands and a memory for storing the computer program.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
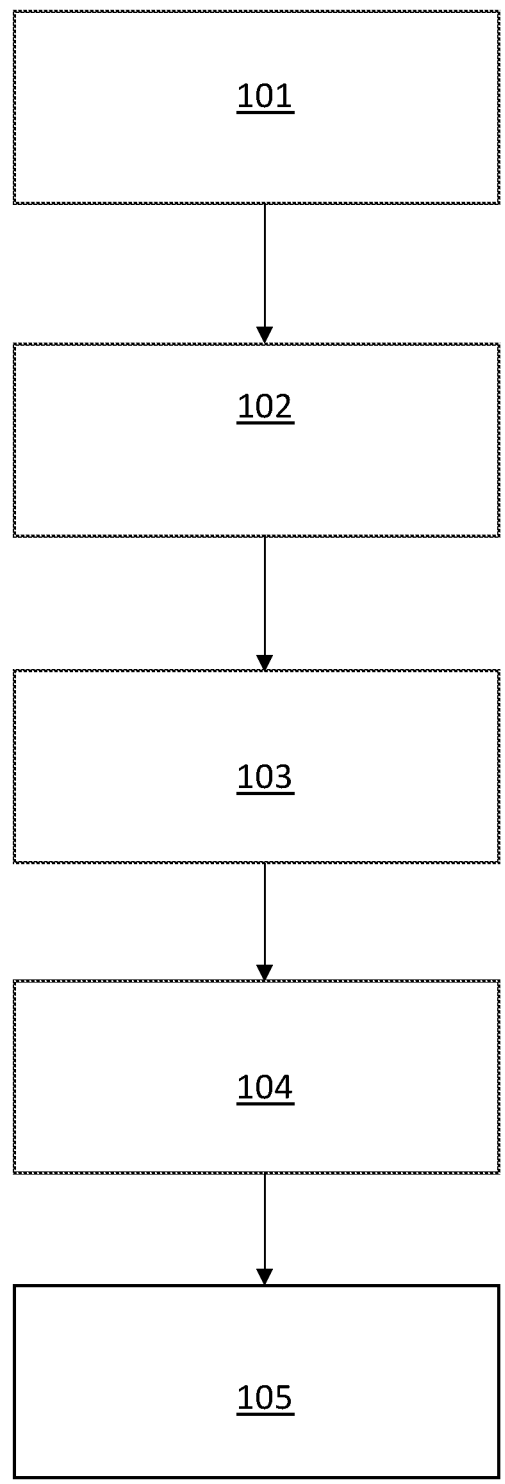
FIG. 1 is a schematic view to visualize a method according to the invention.

FIG. 1 schematically displays a method according to the invention for operating a LiDAR system 1 (see FIG. 2) for detecting the environment in a field of view FOV of the system 1.

According to a first step 101, a detection of at least one temperature measurement is made, which differs from a loading temperature in at least one light source 2 (see FIG. 2) of the system 1. In addition, according to a second step 102, an estimation of the loading temperature is made on the basis of the temperature measurement using an evaluation function. Steps 101 and 102 can also be combined in which the model-assisted estimation is carried out using a thermal model. The model can be designed to reduce the deviation which e.g., is caused by thermal resistance. According to a third step 103, the specification of an operating limit is done which is specific for the maximum thermal load capacity of the light source 2. According to a fourth step 104, a provision of a preset for at least one region of interest ROI (see FIG. 2) in the field of view FOV is made. Subsequently, according to a fifth step 105, an adjustment of an operation of the system 1 is made based on the preset for the region of interest ROI and the estimated loading temperature and the operating limit.

The adjustment of the operation of the system 1, in step 105, comprises a determination of the power distribution in the field of view FOV that is made on the basis of the preset for the region of interest ROI and the estimated loading temperature, so that the loading temperature remains below the operating limit when the system 1 continues to operate. Step 105 also comprises an adjustment of the power of the light source 2 then takes place on the basis of the previously determined power distribution.

The provision of a preset, in step 104, can be supplemented by the provision of a static preset and a dynamic preset. In this manner, the adjustment in step 105 can take place based on the static preset that specifies a minimum power of the light source 2 for predefined positions and/or areas of the field of view FOV. In this way, the adjustment in step 105 can also be made on the basis of the dynamic preset, which specifies a power preset for positions and/or areas of the field of view FOV as a function of the previous environment detection and/or detection by additional sensors.

With regard to step 101, the measurement can optionally be triggered on the basis of the previously determined and set power distribution. For this purpose, the detection pattern can be used by the light source being activated by synchronization with a measured mirror position. The mirror position relates to the position of a mirror for deflecting the light emitted by the light source. Deflection units other than mirrors can also be used.

Figure 2:
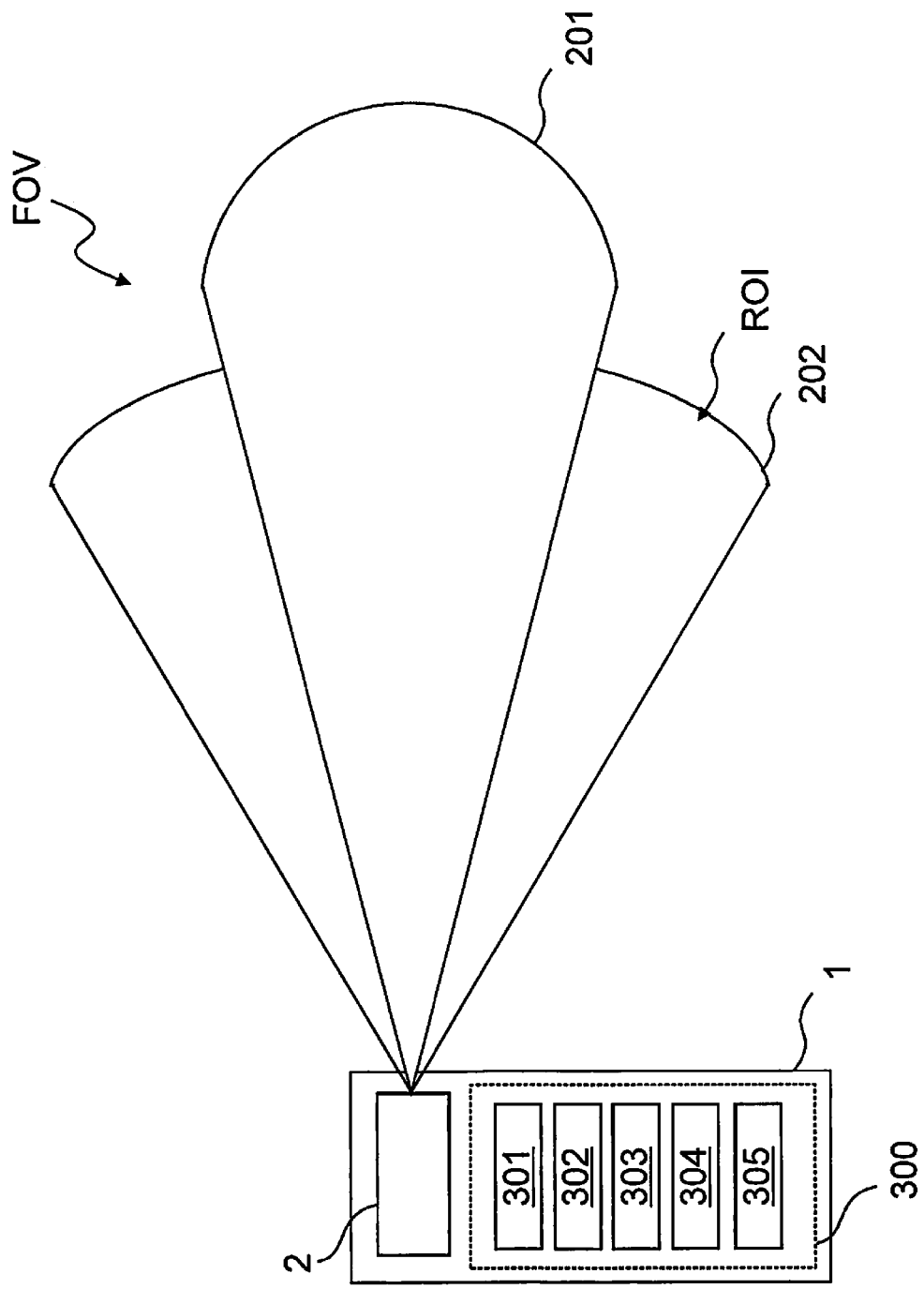
FIG. 2 is a schematic view of a system according to the invention.

It can also be seen in FIG. 2 that in a central region 201, a greater range is required to detect the environment, and thus a higher power of the light source must be used. In contrast, with the power distribution in the edge area 202, the power can be reduced since only a smaller range is required.

FIG. 2 further shows a system 1 for detecting the environment in a field of view FOV of the system 1. In this case, a detection component 301 is provided, which is used for the detection, in step 101, of at least one temperature measurement. Furthermore, an estimation component 302 can be used for the estimation, in step 102, of the loading temperature on the basis of the temperature measurement using an evaluation function. Furthermore, a specification component 303 is provided for the specification, in step 110, of an operating limit and a provision component 304 for the provision, in step 104, of a preset for at least one region of interest ROI in the field of view FOV. An adjustment component 305 can then be used for the adjustment, in step 105, of an operation of the system 1 based on the preset for the region of interest ROI and the estimated loading temperature and the operating limit. The components 301-305 can be part of a control and/or evaluation device 300.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a LiDAR system for a detection of an environment in a field of view of the LiDAR system, the method comprising:
    detecting at least one temperature measurement, which deviates from a loading temperature, in at least one light source of the LiDAR system;
    estimating the loading temperature based on the at least one temperature measurement using an evaluation function;
    specifying an operating limit, which is specific for a maximum thermal load capacity of the at least one light source;
    providing a preset for at least one region of interest in the field of view; and
    adjusting an operation of the LiDAR system based on the preset for the at least one region of interest, the estimated loading temperature and the operating limit.

2. The method according to claim 1, wherein the evaluation function comprises a model so that the estimation is carried out with the aid of the model, and wherein the loading temperature is specific for a junction temperature and/or at least one other maximum component temperature of the at least one light source.

3. The method according to claim 1, wherein the adjustment of the operation of the LiDAR system comprises:
    determining a power distribution in the field of view based on the preset for the at least one region of interest and the estimated loading temperature, so that the loading temperature remains below the operating limit during further operation of the LiDAR system and
    setting a power of the at least one light source based on the previously determined power distribution.

4. The method according to claim 1, wherein the adjustment of the operation of the LiDAR system comprises setting a power of the at least one light source, wherein the at least one light source is a laser and/or a semiconductor light source.

5. The method according to claim 1, wherein the adjustment of the operation of the LiDAR system comprises setting a power of the at least one light source to specify a subsequent detection pattern with which the power of the at least one light source is preset for different positions and/or areas of the field of view.

6. The method according to claim 5, wherein the setting takes place based on a static preset which specifies a minimum power of the at least one light source for predefined positions and/or areas of the field of view.

7. The method according to claim 5, wherein the setting takes place based on a dynamic preset which specifies a performance preset for positions and/or areas of the field of view as a function of an environment detection and/or a detection by additional sensors.

8. The method according to claim 1, wherein the adjustment of the operation of the LiDAR system comprises step of setting a power of the at least one light source based on a required range in an environment detection.

9. The method according to claim 1, wherein the adjustment of the operation of the LiDAR system comprises determining a power distribution of the at least one light source in the field of view based on the preset for the at least one region of interest so that a power is increased for the at least one region of interest and reduced outside the at least one region of interest.

10. The method according to claim 1, wherein the specification of the operating limit takes place based on the estimated loading temperature so as to plan a thermal budget with which the LiDAR system is operated as per the adjustment of the operation.

11. The method according to claim 1, wherein the adjustment of the operation and/or the specification of the operating limit is carried out based on the estimated loading temperature so as to determine a reserve capacity for the operation of the LiDAR system.

12. A system for detection of an environment in a field of view of the system, the system comprising:
    a detector to detect at least one temperature measurement which differs from a loading temperature in at least one light source of the system;
    an estimator to estimate the loading temperature based on the at least one temperature measurement using an evaluation function;
    a setter to set an operating limit which is specific for a maximum thermal load capacity of the at least one light source;
    a provision component to provide a preset for at least one region of interest in the field of view; and
    an adjuster to adjust operation of the system based on the preset for the at least one region of interest, the estimated loading temperature and the operating limit.

13. The system according to claim 12, wherein the detector is a temperature sensor and is arranged in an environment outside the at least one light source.

14. A non-transitory computer-readable medium storing a computer program thereon that comprises commands which cause a control and/or evaluation device to execute the following steps when the computer program is run:
    detecting at least one temperature measurement, which differs from a loading temperature, in at least one light source of a system;
    estimating the loading temperature based on the detected at least one temperature measurement using an evaluation function;
    specifying an operating limit, which is specific for the maximum thermal load capacity of the at least one light source;
    providing a preset for at least one region of interest in a field of view; and adjusting an operation of the system based on the preset for the at least one region of interest, the estimated loading temperature and the operating limit.

* * * * *